United States Patent [19]

Sussman

[11] Patent Number: 4,891,872

[45] Date of Patent: Jan. 9, 1990

[54] APPARATUS FOR INCREMENTALLY DRAWING FIBERS

[76] Inventor: Martin V. Sussman, 1361 Massachusetts Ave., Lexington, Mass. 02173

[21] Appl. No.: 191,620

[22] Filed: May 9, 1988

[51] Int. Cl.$^4$ .............................................. D02J 1/22
[52] U.S. Cl. .................................... 28/244; 264/290.5
[58] Field of Search ........................ 28/244; 264/290.5

[56] References Cited

U.S. PATENT DOCUMENTS

| | | | |
|---|---|---|---|
| 2,181,934 | 12/1939 | Blount | 28/244 X |
| 3,518,822 | 7/1970 | McCard | 28/244 X |
| 3,551,550 | 12/1970 | Bauer et al. | 28/244 X |
| 3,766,614 | 10/1973 | Coats et al. | 28/244 |
| 3,978,192 | 8/1976 | Sussman | 28/244 X |

FOREIGN PATENT DOCUMENTS 81253 11/1951 Czechoslovakia .................... 28/244

Primary Examiner—Werner W. Schroeder
Attorney, Agent, or Firm—Schiller, Pandiscio & Kusmer

[57] ABSTRACT

A fiber drawing process and apparatus in which the fibers are drawn in small increments by passing the fibers in multiple wraps over on rotatably mounted spaced apart spindles having discrete circumferential microterraced surfaces which support the fiber. The terraced surfaces are parallel to the axis of rotation of the spindles and each microterraced surface having a continually increasing radius. The number of microterraces is equal to or less than the number of wraps of the fiber about the spindle. Cylindrical rolls in tandem with the microterraced spindles permit fine adjustments of the draw ratios.

16 Claims, 14 Drawing Sheets

APPARATUS FOR INCREMENTALLY DRAWING FIBERS

This invention relates to methods and apparatus for drawing fibers. More particularly, this invention relates to drawing fibers at high speeds on microterraced drawing surfaces.

U.S. Pat. No. 3,978,192, incorporated herein by reference, pioneered a new technique that has come to be known as the Incremental Draw Process (IDP). The IDP process is used to draw an elongated synthetic resin member (e.g. fiber, filament, yarn, tow or tape) at high speeds. The fiber, or other member, is caused to follow a multiplicity of turns between canted, spaced apart bodies, at least one of which has a drawing surface defined by a continuously increasing radius. A microterraced drawing surface topography on the latter body facilitates compact construction of the equipment and yields improvements in operation.

Unlike conventional continuous drawing processes that jerk or impulsively accelerate fibers into their final orientation, IDP moves the fiber in small stages to its drawn condition. This is accomplished by having the fiber repeatedly pass between shaped advancing spindles that have diameters or terraces that increase in the direction of fiber advance so that each and every pass creates a small draw increment. The increased speed permitted by this gentle acceleration technique increases productivity and even allows fiber to be drawn directly from high speed spinning so that fibers take on their final dimensions on the spinning machine and intermediate packaging and handling of the undrawn fiber can be eliminated.

The fiber drawn in the IDP follows a helical path as it moves in a multiplicity of turns from one spindle to the other and back. The pitch of the helix path increases as the diameter of the spindle and U.S. Pat. No. 3,978,192 describes spindles that are microterraced with the distance between the microterraces increasing along the axial length of the body in relation to the increase in the pitch of the fiber helix as the diameter of the roll body increases.

U.S. Pat. No. 3,978,192 further distinguishes between initial fiber holding surfaces and microterraces. It teaches that there are at least as many microterraces as there are turns of the fiber about the spindle. Furthermore, as usually practiced, the fiber being drawn does not run on consecutive microterraces on the same spindle but only on microterraces corresponding to the pitch of the natural helix. Hence, in operation there may be one or more unoccupied microterraces between each occupied or fiber bearing microterrace. In addition, during the operation of the drawing process the microterraces do not always lie where the optimally stable helical path is located.

In addition, Shah (M.S. Thesis, Tufts University, 1976) teaches fiber heating during drawing by a heated box that encloses both spindles. Shah's system is an inflexible heating means that cannot be used to subject different draw increments to different temperatures. Oh (M.S. Thesis, Tufts University, 1986) describes a flat interspindle heating plate which because it is flat cannot make uniform contact with all fiber wraps during their interspindle passages. This is because the fiber turns in interspindle passage do not lie in one flat plane but instead lie along a slightly twisted three dimensional or hyperbolic surface.

SUMMARY OF THE INVENTION

The primary object of the present invention is to provide an improved apparatus and a process for drawing fibers in small increments by passing the fiber with plural helical turns between a plurality of spaced-apart spindles, each of which is elongated about an axis that extends transversely to the helical turns of the fiber thereon and is canted relative to the axis of the other spindle. At least the first spindle having a rotating fiber-bearing outer surface, the radius of which changes along the axis thereof by discrete increments or decrements so as to form individual microterraces that each engage the fiber with frictional contact. The fiber-bearing surfaces being formed of a cylindrical surface, generally of first contact, followed by a plurality of discrete circumferential microterraces of different radii which are substantially parallel to the axis of rotation of the spindle and the fiber-bearing surfaces supporting each helical turn of the fiber with essentially no substantial axially-directed restraint imposed by the first spindle on the fiber. Each microterrace of said fiber-bearing surface of each said spindle is contacted with at least one corresponding wrap of fiber during drawing. Two or more fibers may be drawn simultaneously over the spindles.

Another object of the present invention is to provide an improved microterraced draw spindle that has microterraces that are dimensioned so as to stabilize the helical path traversed by the fiber during incremental drawing and make the stable helical path insensitive to fluctuations in the tension or axial position of the fiber being drawn and where the number of these microterraces is either equal to or less than the number of line contacts the fiber makes with the spindle.

Another object of the invention is to provide improved microterraced draw spindles each of whose microterraces impose a designated increment of draw on the fiber at each interspindle passage and where each of the microterraces has a maximum axial extension or width defined in terms of the designated draw increment.

An additional object of the present invention is to provide a spindle whose number of surface microterraces is minimized. By reducing the complexity of the spindle surfaces, the cost of the spindle is reduced and heating elements can be placed within the draw roll to coincide with the microterraces.

A further object of the invention is to provide a spindle arrangement which fulfills the foregoing objectives and is designed to be relatively inexpensive to manufacture and assemble.

A further objective of this invention is to provide flexible control of draw ratio when microterraced draw rolls are used.

Other objectives are to provide an improved method and apparatus for spinning and drawing gel-spun fibers and liquid-crystal fibers and to improve the mechanical properties of certain man-made fibers.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

DESCRIPTION OF THE DRAWINGS

For a fuller understanding of the nature and objects of the present invention, reference should be had to the following detailed description which is to be considered together with the accompanying drawings which illustrate the preferred form of the invention.

Throughout the drawings like reference numbers refer to similar structure.

FIG. 2 shows a side view of a pair of matched mutually canted incremental drawing spindles in accordance with the present invention.

As seen in FIGS. 1 and 2, a pair of improved incremental draw spindles 10 and 20 have an improved surface topography. Fiber 5 is shown to wrap around a first or upper spindle 10 and a second or lower spindle 20 having axes 11 and 21 respectively. $\phi$, in FIG. 1, represents the angle of cant, defined hereinafter, between the spindle axes. The spindles may be driven from either end, but are preferably driven from the small diameter end.

Figure 1:
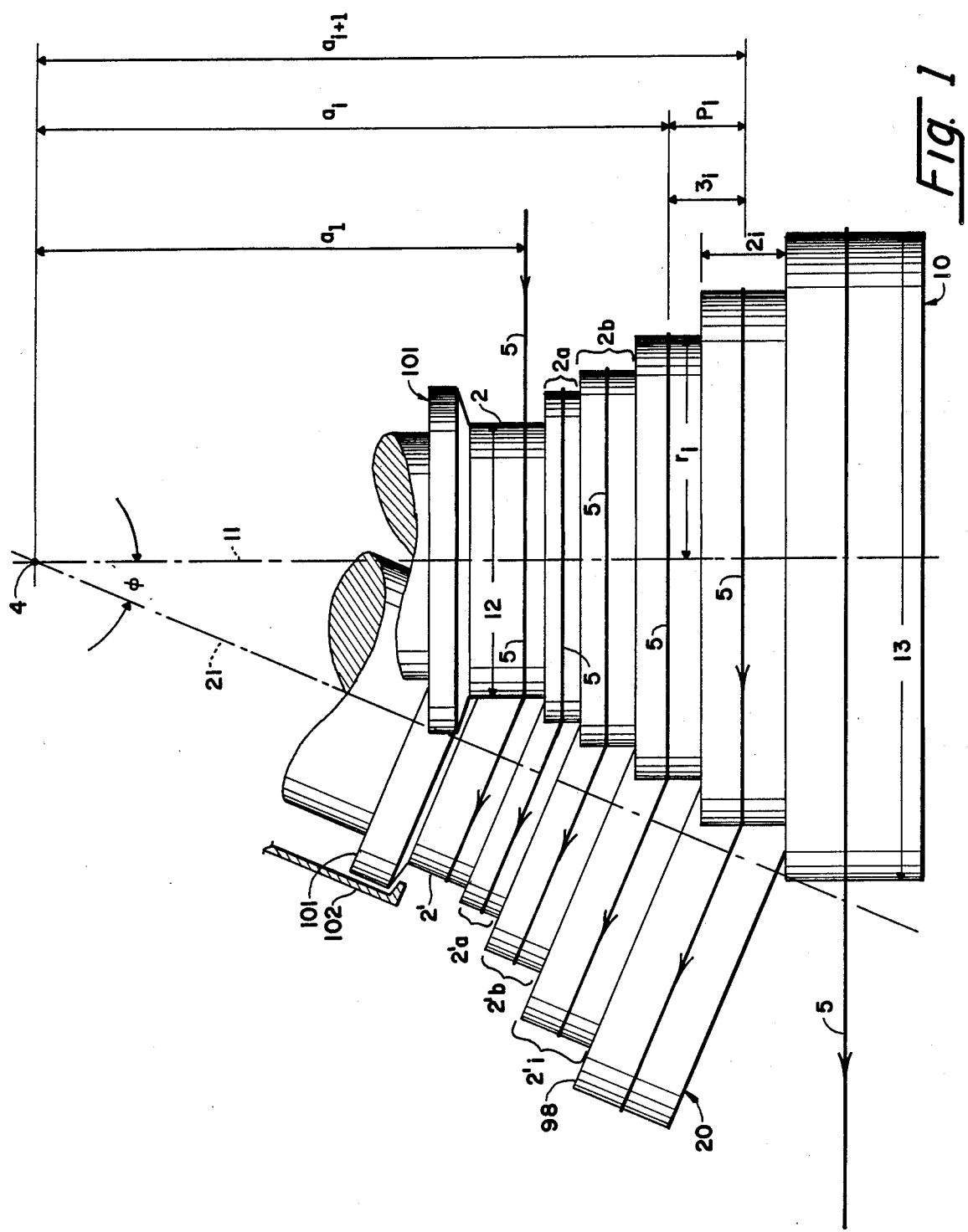
FIG. 1 shows a top view of a pair of mutually canted incremental drawing spindles in accordance with the present invention viewed to show the angle of cant of the axis of the drawing spindles.

On such improved draw spindles 10 and 20 with pre-established inlet diameters 12 and 22 and outlet diameters 13 and 23, respectively, and a given angle of cant, $\phi$, the axial length dimension of each microterrace is uniquely related to the magnitude of the draw increment at that interspindle passage. A characteristic of the improved surface topography is that each of the microterrace axial length dimensions, or widths ($2a, 2b \ldots 2i$ on spindle 10 and $2a', 2b'$ on spindle 20) corresponds or is generally approximately equal to the corresponding pitch dimension, $p_i$ ($3a, 3b \ldots 3i$ on spindle 10) and $p_i'$ ($3a', 3b' \ldots 3i'$ on spindle 20) of the helical path made by fiber 5 as it passes back and forth between the microterraced draw spindles 10 and 20. The pitch is the axial distance between the fiber resting on a microterrace and the fiber resting on the preceding microterrace on the same spindle.

As seen in FIGS. 1 and 2, the risers 98 between each of the microterraces are shown to be flat annular surfaces that are perpendicular to the axis of rotation. These risers between microterraces may also be curved and take on an elongated "S" shape that inclines slightly in the direction of helix advance.

The pitch dimension $p_i$, is described by the equation:

$$p_i = [(DI_i + \cos \phi)r_i - a_i \sin \phi] \sin \phi \qquad \text{[Equation (1)]}$$

Equation (1) teaches how to assign an optimal axial length dimension to an incremental draw spindle microterrace while affecting a given draw increment. It therefore differs very significantly from equations published by Sussman (Fiber World, pg. 58–62, April, 1985; Proceedings International Symposium on Fiber Science and Technology, pg. 228, Hakone, Japan, 1985, Proceedings Fiber Producer Conference pgs. 6B-5–6B-9, Greenville, S.C., 1986) and a masters thesis by Sussman's student Shah (Tufts University, 1976) that only describe the pitch of a fiber helix on a conical spindle having an internal cone angle $\alpha$.

In Equation (1), $\phi$ is an angle of cant of well spaced apart spindle axes as measured in the projection shown in FIG. 1 along the perpendicular common to both spindle axes;

$a_1$ is the axial distance between the point of intersection 4 of the spindle axes 11 and 21 in the above projection and the first intersection of the fiber with the upper or first spindle axis;

$a_i$ is the axial distance between the point of intersection 4 of the spindle axes and the "i"th intersection of the fiber wrap with the first or upper spindle axis in the above projection. $a_i$ depends on $a_1$ as follows:

$$\sum_{x=1}^{i-1} p_{xi} \qquad \text{[Equation (2)]}$$

$p_i$ is the axial pitch, or distance as measured on the spindle axis between consecutive intersections of fiber wraps with the first or upper spindle axis; or the axial length difference between $a_{i+1}$ and $a_i$;

$r_i$ is the radius of the upper or first microterraced spindle at axial distance $a_i$;

$$r_1 \pi \prod_{x=1}^{i-1} (DI_x);$$

= $r_1$ times (the product of all draw increments, DI and DI′, preceding microterrace $r_i$);

$r_1$ is the radius of the spindle at the point of first contact, or one half of the diameter 12;

$DI_i$ is the draw ratio increment imposed on a fiber as it moves from the first spindle 10 to the second spindle 20, at microterrace i of radius $r_i$ and at position $a_i$; it is equal to ratio of the radius of the microterrace receiving the fiber leaving microterrace i to the radius of the microterrace sending the fiber, or $DI_i = r'_i/r_i$. DI is usually greater than one, but may on occasion be less than one to permit controlled amounts of contraction or relaxation of the fiber.

The pitch of the fiber helix on the second microterraced spindle contacted by the fiber during incremental drawing will usually be slightly different than the pitch on the first and is given by Equation (3):

$$p'_i = [(DI'_i + \cos \phi)r'_i - a'_i \sin \phi] \sin \phi \quad \text{[Equation (3)]}$$

where the primed (') symbols refer to the same quantities as in Equation (1) but on the second spindle 20 contacted. $DI'_i$ is the equal to $(r_{i+1})/r'_i$ and is the draw or elongation increment imposed on fiber leaving the lower or second spindle terrace at $a'_i$ and moving to the first or upper spindle. $a'_i$ is related to $a'_1$ as follows:

$$\sum_{x=1}^{i-1} p'_x \quad \text{[Equation (4)]}$$

and $a'_1$ is in turn related to $a_1$ by:

$$a'_1 = a_1 \cos \phi + r_1 \sin \phi \quad \text{[Equation (5)]}$$

From the above it is clear that the axial dimension $2i$ or $2i'$ of each microterrace varies with the position of the microterrace on the spindle axis in the manner specified by the above equations. As a consequence of the correspondence of microterrace axial dimension to the pitch of the fiber helix, each successive wrap of the fiber will rest on only one successive microterrace and makes only one circumferential segment line contact or wrap on that microterrace whenever the product of $DI_i$ and $DI'_i$ is not equal to unity, so that the number of microterraces on a spindle is generally less than the number of circumferential segment line contacts the fiber makes on the spindle, as shown in FIGS. 1 and 2. Generally on an optimally designed set of microterraced spindles the microterrace axial dimensions or widths on each roll will correspond to the helix pitch on that roll and therefore need not be the same on both spindles. In addition as shown in FIGS. 1 and 2, the number of microterraces on each spindle may differ. In FIGS. 1 and 2, the first spindle has five (N) microterraces whereas the second has four (N−1).

This improvement produces important advantages. It simplifies the construction of the spindles by reducing the number of terraces. It provides each microterrace with maximum axial extension or width and thereby improves the stability of the fiber helix to lateral disturbances. Most importantly, the extended axial width of the microterraces permits a multiplicity of separate fibers to be drawn simultaneously (shown in FIGS. 3 and 15) on a single set of spindles so as to improve the productivity of the process by many fold. The axial dimensions $2i$ can range from approximately 0.2 cm to over 10 cm.

Other features of the improved topography microterraced spindle are that the surfaces of the first fiber contact 2 and 2' have an axial extension dimension that is at least equal to the axial extension dimension $2a$ of the first microterrace on that spindle and preferably be more than twice that dimension in order to provide a temporary storage space on the spindle inbound of the point of the first fiber contact for broken filament wraps that may occasionally occur during drawing. Such broken filament wraps can easily be pushed to the storage since inboard of the first microterrace without stopping the spindles and the incremental draw process. A raised shoulder 101 is provided on the drive shaft side of the surfaces 2 and 2' to prevent fiber from wandering onto the drive mechanism. A stationary cylindrical cover or shroud 102 inhibits the entry of of the fiber onto the drive shaft and mechanism.

Figure 3:
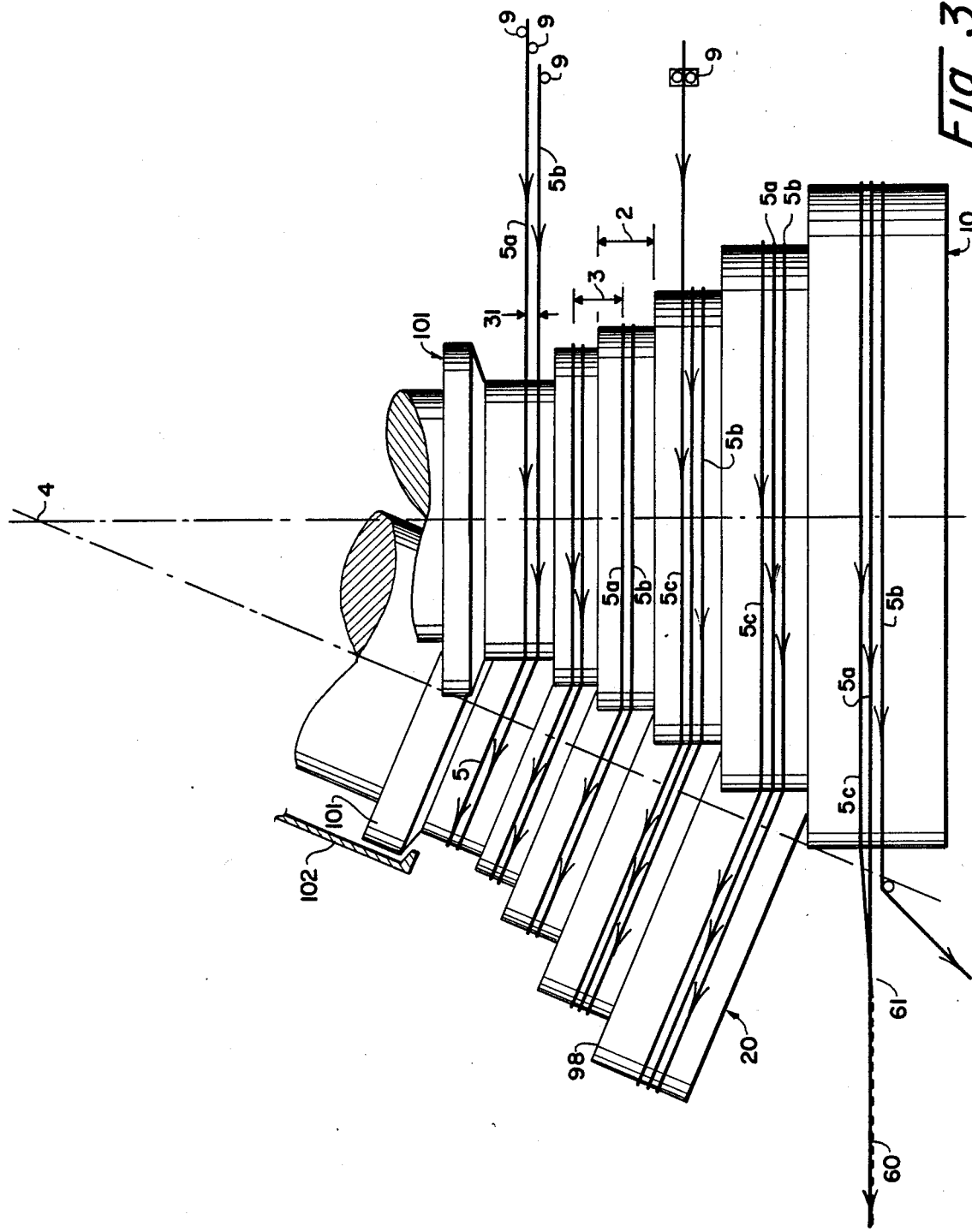
FIG. 3 shows a top view of a pair of mutually canted incremental drawing spindles in which more than one fiber travels along each microterrace with some fibers entering the drawing spindles on different microterraces.
Figure 3:
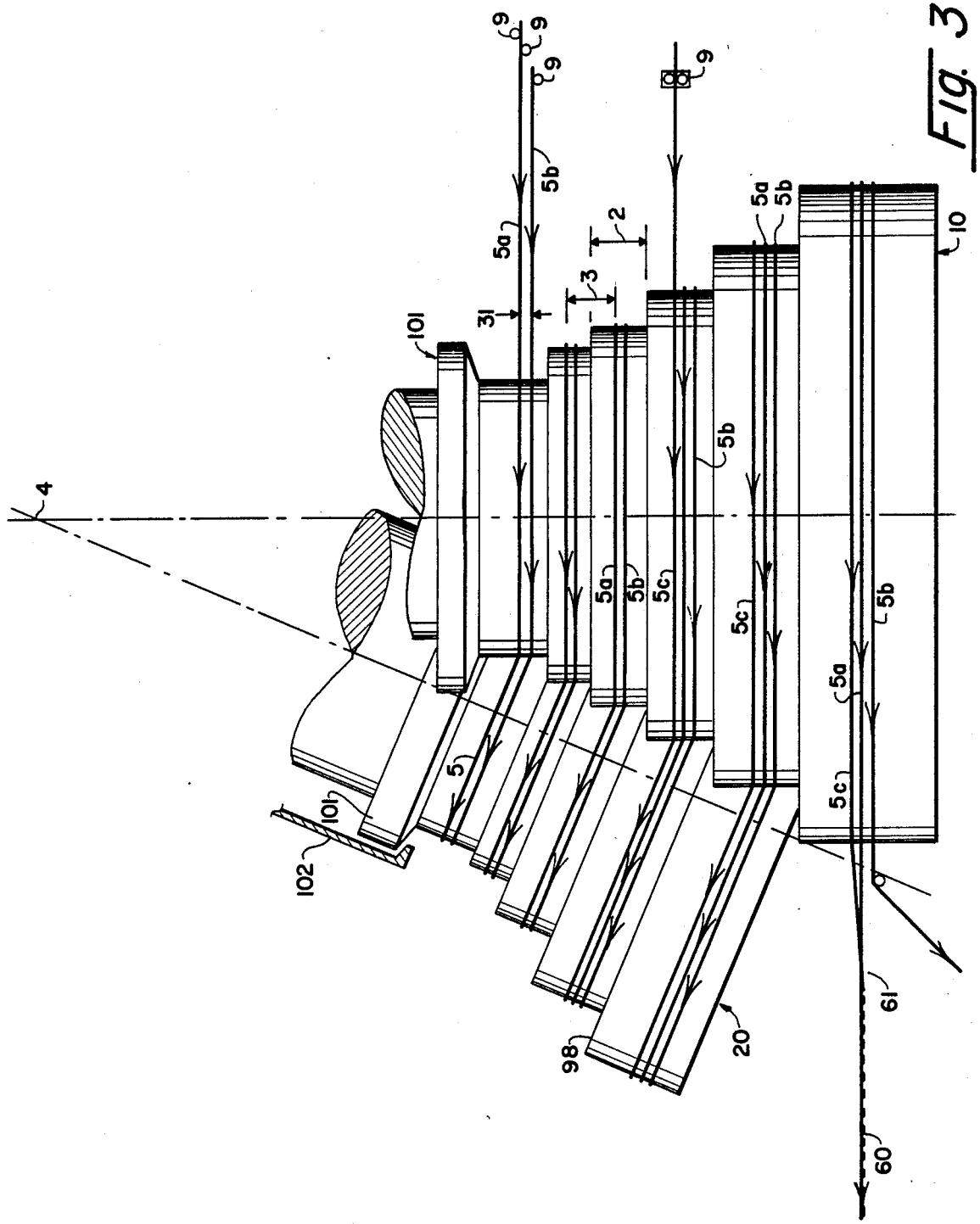

FIG. 3 shows the method and apparatus for operating a single set of the microterraced incremental draw spindles with multiple and separable sets of fibers so as to draw each of the fibers simultaneously yet separately. In FIG. 3, two separate fiber sets 5a, 5b are shown entering on a pair of microterraced incremental draw spindles having axial terrace dimensions $2a, 2b \ldots 2i$ substantially equal to the helix pitch $3i$ of the fiber 5a that makes first contact with the draw spindle surface at a point closer to axis intersection point 4 than that of other fibers such as 5b being simultaneously processed. The number of microterraces on a given spindle is generally equal to the number of helix turns or wraps of an individual fiber on the microterraced spindle. On leaving the last microterrace each of the fibers 5a, 5b may be taken off separately for further processing or they may be combined to form a single heavier fiber.

For operation with multiple fibers the use of entry placement means such as guides 9 shown in FIG. 3 is highly desirable. The guides fix the location of the points of first contact of each fiber on the microterraced draw-rolls, as well as the initial separation distances 31 of the entering fibers one from another. This initial separation distance must be sufficiently large to allow for the slight reduction in the separation that occurs on each subsequent interspindle passage. The placement means 9 also fix the sequence of each of the several fibers on the microterrace surface where first contact is made. Once the sequence of the separate fibers relative to each other is established by the entry-placement means 9, the sequence is maintained throughout the drawing process on each of the microterraces without employment of additional guides. As a consequence, the individual fibers may be separated for packaging or further processing as they leave the draw apparatus. Only two fibers are shown in FIG. 3 at initial entry. Many more fibers can be drawn simultaneously. The number of fibers drawn is limited only by number which can lie side by side on the first or narrowest microterrace.

A preferred configuration for the entry placement means or guides 9 is shown in FIG. 3, the guides 9 may be rollers that fix the sequence and the initial separation of the fibers. Alternately, the guide may be a staggered array of ceramic slots or teeth.

FIG. 3 also shows that multiple fibers can be differentially drawn on the same pair of incremental draw rolls. As an example, threadline 5c makes first contact with the upper draw roll at a larger diameter miroterrace than fibers 5a and 5b. As a consequence, fiber 5c is drawn to a lesser extent or to a smaller draw ratio than the fibers making earlier contact on the draw spindles. When two or more fibers enter the incremental drawing operation so as to make first contact on the spindles on different microterraces, the portions of the fiber that make earlier contact are drawn to a greater extent than the portions that make later contact. Fibers 5a and 5b contact the spindle before the first microterrace and are drawn to a greater extent than fiber 5c which contacts the spindle on an intermediate microterrace.

The differentially drawn threadlines 5a and 5c may be combined into a single fiber 60. The component filaments of such a composite fiber will tend to shrink to slightly different extents so that such a composite multifilament fiber will exhibit high bulk and loft on subsequent crimping and heat treatment.

The process of differential drawing is illustrated in FIG. 3 where one fiber 5c enters on a pair of incremental draw rolls and makes first contact with the roll surface on a larger diameter microterrace than the fiber identified as 5a and 5b. At point 61 the greater 5a and lesser 5c drawn fibers are combined into a single heavier fiber 60. It is clear from the foregoing that many kinds and combinations of differential draw of fibers on a given set of incremental draw rolls are possible. Fibers may not only enter at different microterraces as shown in FIG. 3, but may also enter at the same microterrace and exit at different microterraces to produce different draw ratios among fibers being simultaneously drawn.

Figure 4:
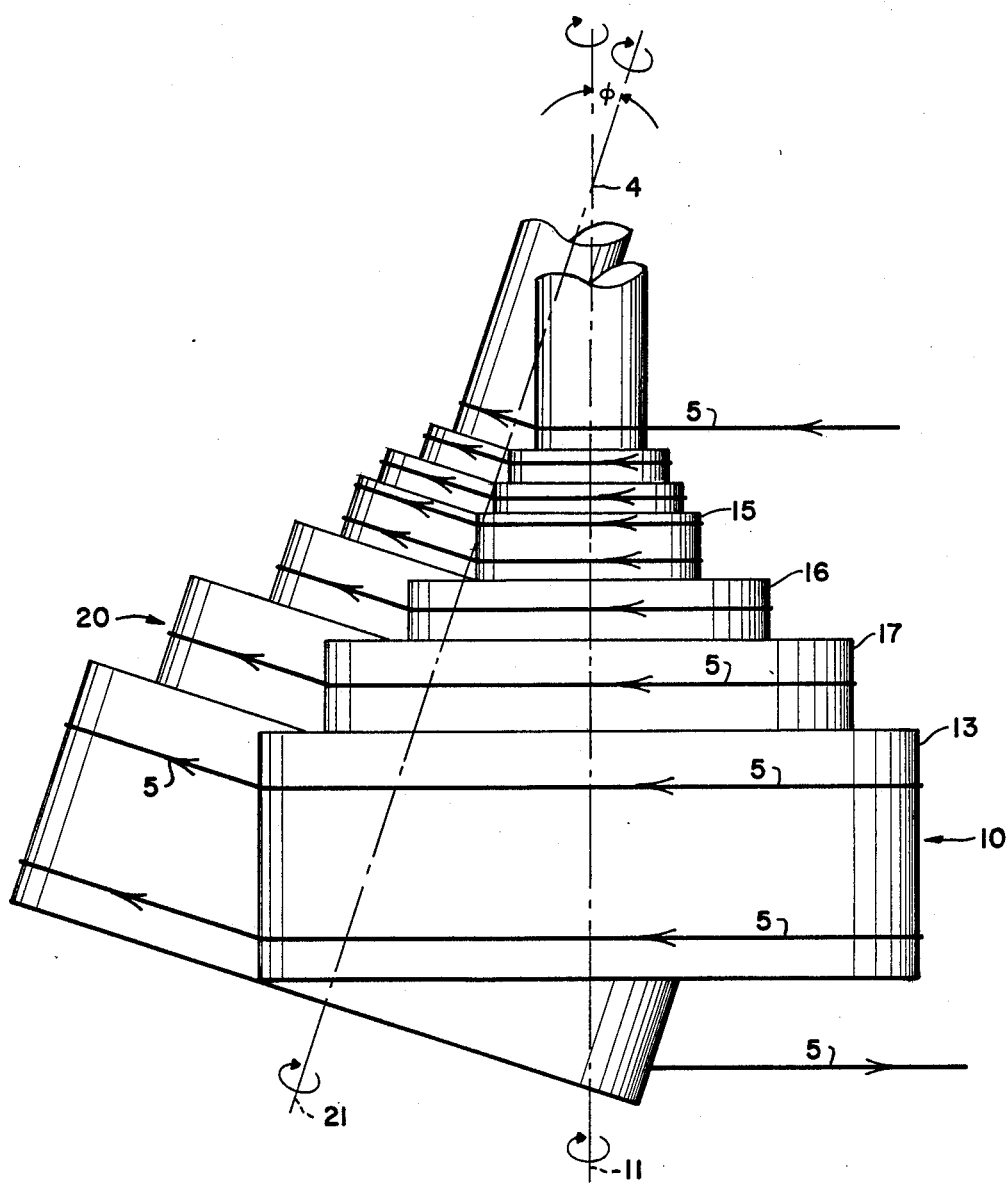
FIG. 4 shows a view of a pair of mutually canted incremental drawing spindles in which one fiber makes one or more turns on each microterrace.

FIGS. 1, 2 and 3 and the previous paragraphs describe microterraced rotating draw spindles in which the number of terraces on each spindle is equal to the number of passes or helix wraps made by the fiber on those spindles. With this arrangement, each pass of the fiber helix contacts each microterrace only once, with the result that the helix formed by the fiber and the terrace number have the same frequency. FIG. 4 by contrast, shows incremental drawing with multiple turn on some of the microterraces. Many combinations of multiple turns are possible for any set of spindles.

When dealing with slippery fibers or with large draw increments, or when it is desired to augment heat setting and relaxation, or otherwise treat fibers in the midst of their draw passage over the spindles in order, for example, to produce fibers having low thermal shrinkage, it is advantageous to construct draw spindles wherein the terraces have a lower frequency of occurrence than the helix turns, so that a fiber 5 makes contact with all or some microterraces two or more times when contacting a surface other than the initial holding surface. In FIG. 4, note that fiber 5 passes on microterraces 13 and 15 twice and only once on terrace 16 and 17. The spindles may be built so that the number of microterraces may be considerably smaller than the number of fiber wraps on the incremental draw spindles. Where the incrementally drawn fiber 5 makes two wraps on a microterrace, the frictional resistance to slippage is increased at each draw increment and the residence time and relaxation time is increased in the draw zones. Clearly within the scope of this "asynchronous terracing" principle many different combinations of wraps of fiber on draw terraces are possible. Asynchronous terracing may also be combined with differential drawing. To accomplish asynchronous terracing the $DI_i$ set that is specified for an improved pair of microterraced rolls will contain consecutive draw increment values, that is consecutive value of $DI_i$ and $DI'_i$ or $DI'_i$ and $DI_{i+1}$, whose products are equal to unity whenever two consecutive wraps of a fiber rest on the same microterrace.

Figure 5:
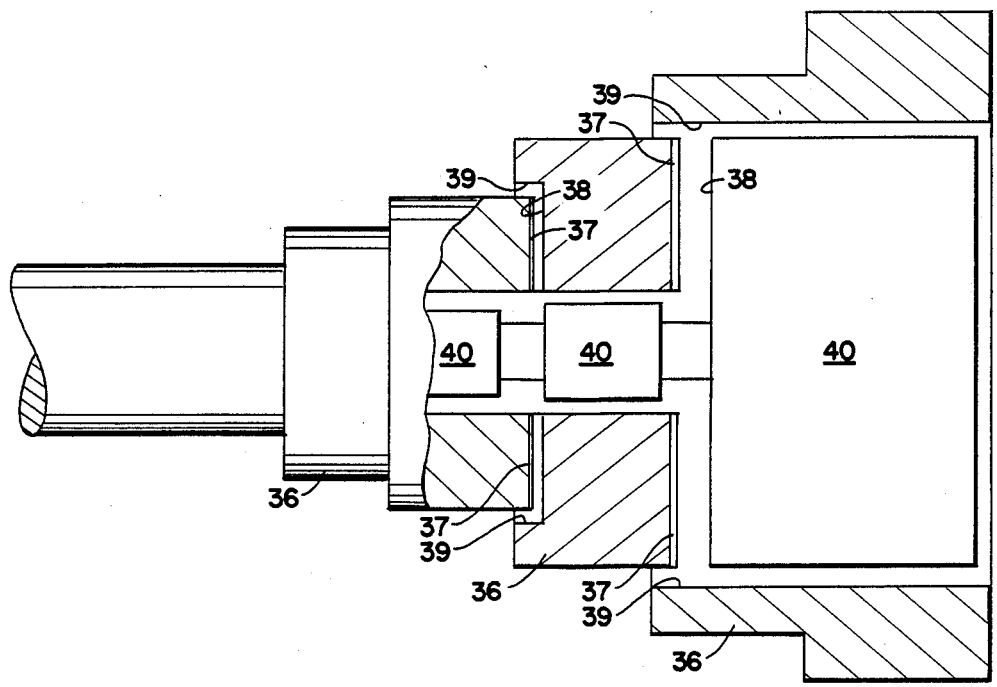
FIG. 5 shows a partial cutaway view of a drawing cone having segmented, differentially heated microterraces.

FIG. 5 illustrates an improved means for imposing a temperature gradient on a rotating microterraced draw roll where each microterrace or group of microterraces is provided with separately controllable heating means. The microterraced roll can be a composite assembly constructed of circular segments of conductive material 36 each of which is insulated from its contiguous segments by a thin layer of thermal insulation 37. Where a particularly steep temperature difference is required between contiguous segments, radial finned air passageways 38 are formed on the mating contiguous segments so as to reduce the contact area of the adjacent segments. Air passageway 38 also may be used to promote the rapid flow of air between the segments, thereby reducing the flow of heat from the hotter to the cooler roll segment, and allowing temperature differences as high as 100° C. between adjacent segments to be stably maintained. The segmenting is usually made to coincide with the edge of a microterrace and the outlet side of the terrace 39 is inset into the larger adjacent microterrace so that the joint between segments is covered and therefore will not trap processing filaments. Suitable bolting or clamping means are provided to hold the assembly together.

FIG. 5 further illustrates the heating means 40 placement in a segmented draw body. Rotatable or stationary heat-energizing elements are placed along the axis of the draw roll or are fixed to the inner surface of a microterraced draw spindle that is substantially hollow and delivers heat to the individual temperature segments of the draw roll. The heating means can be electrically activated that is the segments may be inductively heated or resistively heated or supplied by steam or other hot fluid. The cooler segments may be separately energized or energized by heat that is conducted away from the hotter segments.

Figure 6:
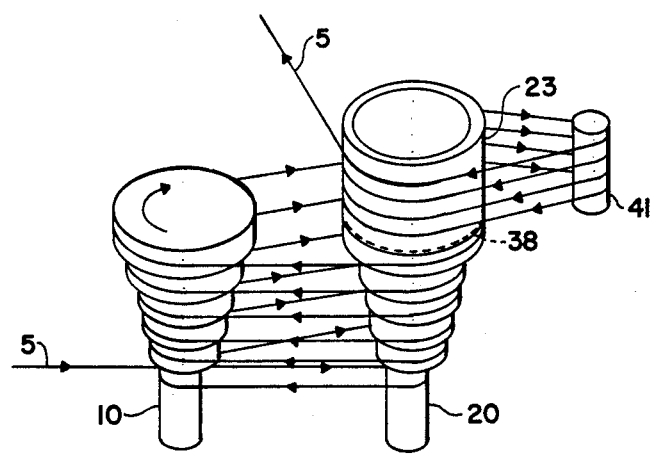
FIG. 6 shows a side view of a pair of microterraced spindles wherein one spindle has an extension for quenching or annealing.

FIG. 6 illustrates the configurations of microterraced incremental draw spindles that permits quenching, or annealing, or heat setting, of the newly drawn fiber 5. In FIG. 6 the spindles are configured so that first spindle 10 is heated and the second spindle 20 is not. Alternatively, both spindles may be heated. A coaxial extension 23 of only one spindle (spindle 20 as shown) has an air-cooled cylindrical unterraced extended segment abutting on the terraced spindle. The unterraced segment has air passages 38 on its abutting face to promote air flow radially through the segment junction. An idler separator roll 41 is placed near the extension so as to allow the placement of a large number of closely spaced wraps of the fiber on the extension which number is independent of the number of wraps and pitch of the fiber helix on the terraced portion of the spindle. This arrangement provides an extended residence time for the fiber on the cylindrical spindle extension and permits quenching of hot drawn fiber in a compact space and on the same spindle drive used for drawing. The arrangement can also be used for annealing and heat setting a fiber by using a suitable heating means on the roll extension.

Figure 7:
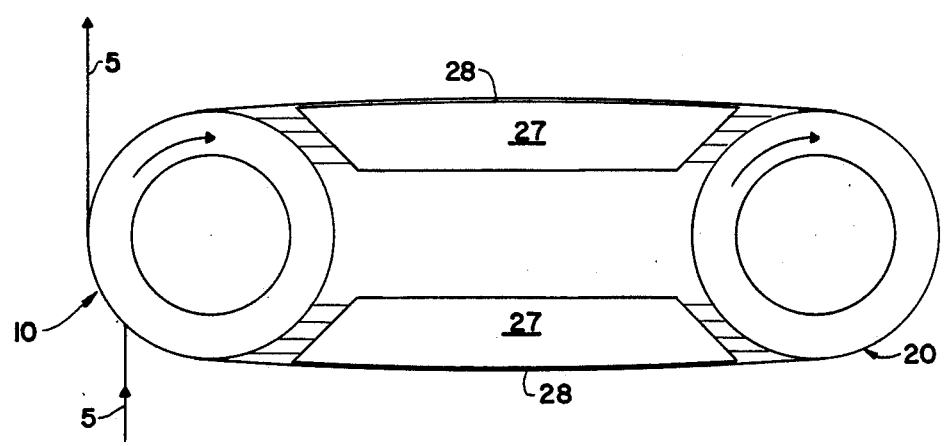
FIG. 7 shows an end view of microterraced spindles with interspindle heaters.
Figure 8:
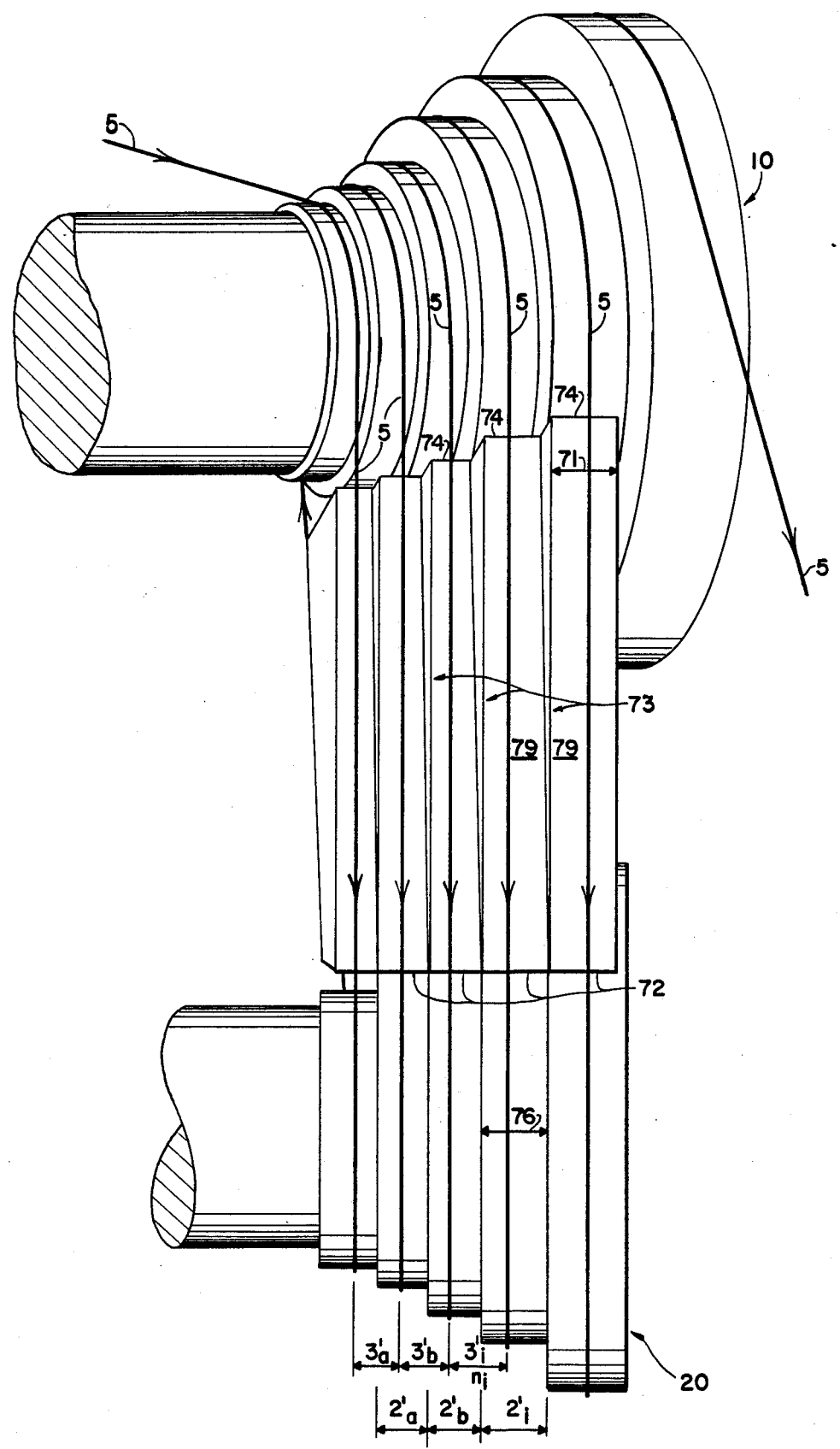
FIG. 8 shows a side view of microterraced spindles with terraced interspindle heaters.

FIGS. 7 and 8 illustrate a method of producing high orientation and high draw-ratio fibers by placement of heating means 27 in the interspindle space so as to control the temperature of the fiber at each interspindle passage. Interspindle heaters 27 may be used in conjunction with, or without heated spindles as discussed above. They may be used on each interspindle passage, on alternate passages, or in various combinations. The interspindle heaters may be radiant, supplying infrared or microwave energy to the fiber without contacting the fiber, or they may be contact heaters having a convex surface 28 and preferably a hyperbolic convex surface over which the fiber slides in its passage between spindles. Another preferred topography for the interspindle contact heater surface is seen in FIG. 8 and shows a terraced surface wherein the terrace dimension 71 in the direction perpendicular to the direction of fiber travel, equals the axial length 2i' of the terrace on the spindle toward which the fiber 5 travels, and where the heater surface 79 and the spindle terrace have a common tangent plane that includes the fiber moving from the heater to the spindle terrace. An even more preferred shape for the interspindle heater is that of a slightly twisted ribbon or hyperbolic surface 73 that has its inlet edge 74 parallel to the terrace of the spindle supplying the fiber, and its exit edge 72 parallel to the terrace receiving the fiber.

The interspindle heaters allow a different temperature of heating to be imposed on the fiber at each incremental draw stage. Therefore a preferred mode of heater construction has terraced surfaces whose abutting portions may be insulated from each with each terraced segment supplied with an independently controllable heat source such as an electrical heating element and a temperature sensor such as a thermocouple or thermistor.

The use of interspindle heating zones is particularly effective for producing fibers that are drawn to very high draw ratios, and fibers that have unusually high levels of molecular orientation. In conventional draw-processing the limits to draw-ratio are determined by stresses that concentrate in the tie molecules stretched between molecular crystallites as the fiber is elongated. These tie molecules, and the fiber, break apart when these stress concentrations get too high. (Prevorsek C. et al. J. Mater. Sci. 12, 2310-2328 (1977). Interspindle heating used in conjunction with incremental drawing permits the stress concentrated in the tie molecules to dissipate at each incremental draw stage thereby inhibiting stress accumulations, and allowing further extension of the tie molecules and the achievement of unusually high draw ratios and high degrees of molecular orientation. The effectiveness of this periodic stress relaxation is increased by relatively long interspindle heating zones, particularly during the processing of fiber at speeds in excess of 100 meters per minute. Interspindle heating zones may range in length from less than 2 cm to over 5 meters but a preferred length range is 0.5 meters to 1.5 meters.

Temperatures of the interspindle heaters will vary according to the nature of the polymer constituting the fiber being processed and according to the processing speed. The temperature on all the interspindle heaters may be the same or follow a profile that can go through a maximum or minimum. For the production of high modulus fibers the preferred temperature profile increases monotonically with the extent of draw, with the initial interspindle heaters at a temperature about 5° C. above the glass transition temperature ($T_g$) of the polymer being drawn, and the final heaters at a temperature about 10° C. below the sticking point or melting point of the fully drawn fiber.

Control of the interspindle distance serves as a means for controlling the time duration of the fiber in interspindle passage and hence the time for and the extent of relaxation of stress in the fiber.

Aramid fibers are generally formed by spinning methods described in U.S. Pat. No. 3,671,542 (1972) issued to Kwolek and U.S Pat. No. 3,869,430 (1974) issued to Blades. These fibers and certain others are composed of long inflexible rod-like polymer molecules having benzene rings and polyaromatic groups along their molecular backbones which groups are held together by rigid inflexible chemical bonds. In solution such rod-like molecules form ordered aggregations or "liquid crystals" that become highly oriented in the direction of flow when extruded through the orifices of a spinnerette. As a consequence liquid-crystal polymers form extraordinarily strong fibers having very high degrees of molecular orientation in the as-spun condition without a further drawing operation.

The tensile strength and particularly the modulus of spun liquid crystalline fibers, such as aramid fibers, can be however substantially increased by drawing them in very small increments so as to increase the fiber length by about a total of 3% to 15%, using heated incremental draw rolls. Interspindle heaters operating at a surface temperature near or above the glass transition temperature of the liquid crystal polymer are preferred heating means. The small extent of draw is made in incremental stages, each of about 0.2% to about 3%, with about 3 to about 12 incremental draw stages being preferred. Where 12 stages are used, each draw stage imposes an average draw increment of about 1.01, so that the total draw ratio is $(1.01)^{12}$ or 1.12. The fiber is then passed to annealing rolls and quenching rolls.

For example, a sample of DuPont "Kevlar 29", a "350 denier aramid" fiber, was passed around a pair of terraced incremental draw rolls having a minimum diameter of 30 cm and a maximum diameter of 33 cm. The rolls had the appearance shown in FIG. 9. Fiber 5 contacted first spindle 10 at point 7 making three turns on the first contact surface 12 and then proceeding to make a single pass on each of the next five microterraces 15-19. The sixth terrace has outlet diameter 13 which is extended so that it accommodates four final helix wraps and serves as an annealing or heat-stabilizing stage. From there the fiber passes to a pair of cold quench rolls 44 and then to a windup package 41 (not shown).

To withstand the high forces required to extend the aramid fiber, the incremental draw spindles 10 and 20 are stabilized by a linkage 46 that connects two flexibly mounted bearings 47 on the cantilevered, or outboard ends of the draw-spindle shafts 48. Linkage 46 stiffens the shafts 48 of the draw spindles and prevents them from flexing toward each other. Interspindle contact heaters 27 are operated at a uniform temperature of about 270° C. Aramid fiber that has been treated in this fashion shows an increase in tenacity of about 1% or 2% and an increase in modulus of about 50% to 70% over the untreated fiber. The percent elongation at break decreases to about 2 to 3% from an untreated value of about 4%.

An improvement in tensile strength and modulus can also be produced in carbon/graphite fibers that are made from pitch and particularly from polyacrylonitrile (PAN) precursor fibers. Polyacrylonitrile (PAN) precursor fibers for carbon fiber and in particular polyacrylonitrile copolymer precursor fibers are lengthened up to about 35% on incremental draw spindles using interspindle heaters set at about 130° C. Such an elongation of polyacrylonitrile fiber is generally not achievable by conventional drawing methods. The carbon/graphite fiber made from the incrementally lengthened polyacrylonitrile precursor fiber by subsequent standard heat stabilization oxidation and graphitization procedures has a higher tenacity and modulus than carbon/graphite fiber made from untreated precursor fiber.

Carbon precursor fibers that are extruded from mesophasic (liquid crystalline) pitch can be drawn incrementally while they are being stabilized, that is, heat treated to promote crosslinking, and partial oxidation of the pitch molecules. The incremental drawing increases orientation of the pitch's thermotropic crystals and improves both the tenacity and the tensile modulus of the finished carbon/graphite fiber. A similar incremental drawing treatment during the stabilization and partial oxidation of polyacrylonitrile precursor fiber also improves tensile strength and modulus of carbon/graphite fiber made from PAN.

As an example of the incremental drawing of precursor fiber, mesophasic pitch is extruded from a melt as fibers that are quenched and fed at a slow speed to an assembly consisting of a set of incremental draw spindles and a double bank of long interspindle heaters that are preferably radiant or convective. The spindles need not be furnished with internal heating means because the heat for crosslinking, oxidation, and drawing is supplied by the interspindle heating means. The interspindle heaters are open to air and are arranged so that the fiber temperature rises from about 200° C. at the first interspindle passage of the fiber, to about 310° C. at the last interspindle passage. The spindles operate at a low speed such that the residence time in the interspindle-heater assembly is about two hours. The fiber makes about twenty wraps about the incremental draw spindles that have a non-linear draw increment profile so that the fiber is drawn about 3% in its first interspindle passages and only 0.2% in its last interspindle passage for a total draw ratio of about 3X. Spindle surfaces and interspindle surfaces may be coated with a ceramic or a non-stick fluorocarbon plastic.

The fiber is then passed into a graphitizing furnace operating at about 1900° C. and in an atmosphere of nitrogen gas. The fiber spends at least five minutes in the 1900° C. nitrogen atmosphere. Fibers made in this manner have tensile strengths and tensile moduli that are 30% to 50% higher than fibers subject to the same heat treatments but without incremental drawing.

Glass fibers may also be incrementally drawn on draw rolls having multiple terraces. With glass fibers it is desirable to use interspindle radiant heaters such as electric heating elements that raise the temperature of the glass fiber to its minimum softening temperature. Strong glass fibers of about 1 micrometer or less in diameter can be made in this fashion at high speeds. The drawn fiber must be coated immediately with a high molecular weight oil or polymer coating to protect it from moisture and crack formation during use.

Figure 9:
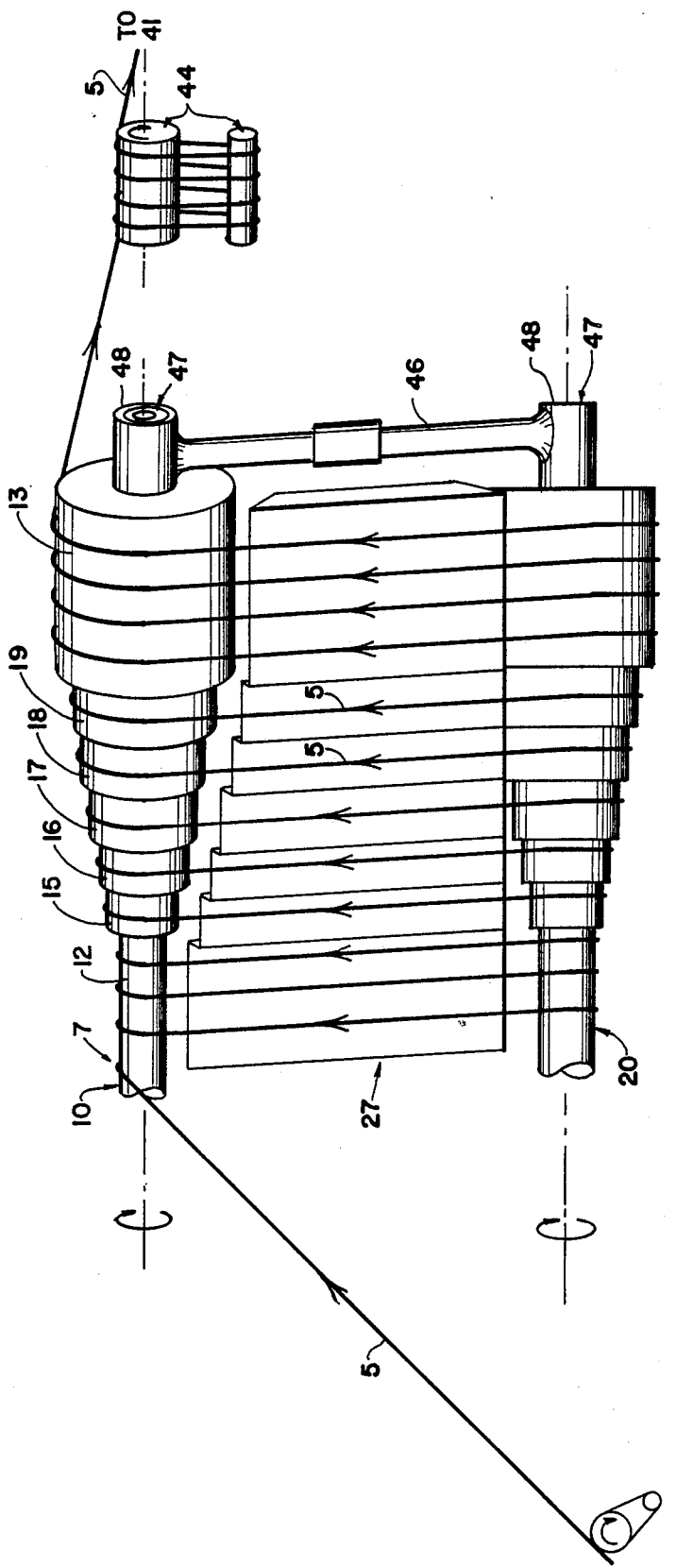
FIG. 9 shows a side view of liquid crystal fibers being post drawn on microterraced spindles having an outboard stiffening linkage and interspindle heaters.
Figure 10:
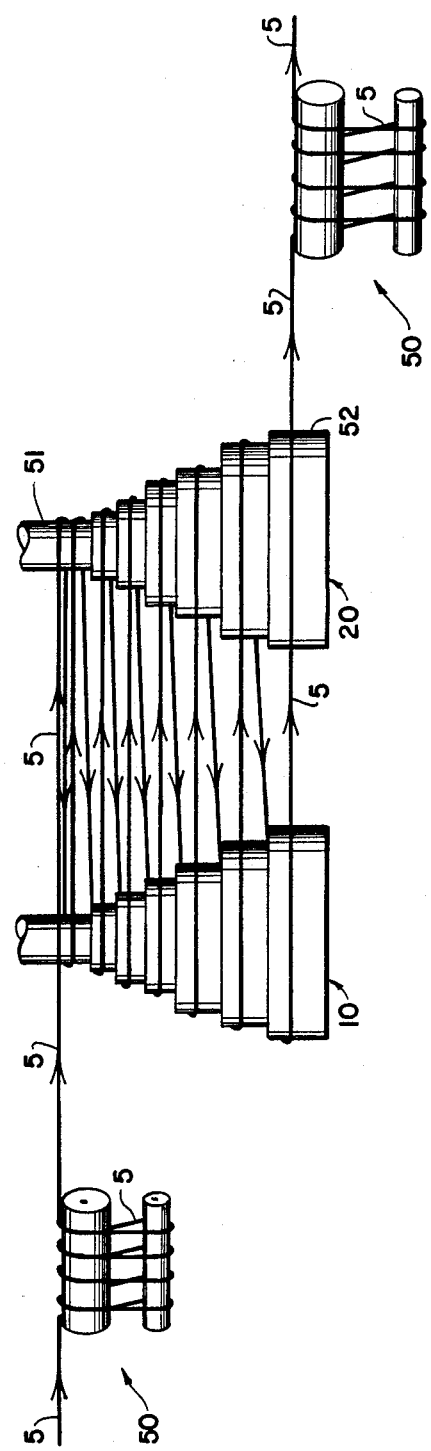
FIG. 10 shows a side view of microterraced incremental draw spindles being used in tandem with cylindrical draw rolls.

FIG. 10 illustrates an improvement on the teaching of U.S. Pat. No. 3,978,192 that is herein termed "tandem drawing". The improvement consists of placing one or more sets of unterraced cylindrical draw rolls 50 in series with the microterraced draw-rolls, which cylindrical draw rolls may precede or follow the microterraced draw rolls in the direction of fiber advance. FIG. 10 includes an oblique view of cylindrical draw-rolls 50. When the cylindrical draw rolls precede the microterraced draw-roll they are preferably heated to above the glass transition temperature of the fiber, and they operate at a surface speed less than that of the first microterrace on which the fiber makes contact with the microterraced draw roll, so that the fiber is partially drawn prior to entering the microterraced rolls. Alternatively or additionally, the cylindrical draw rolls 50 may be placed in a tandem position following the microterraced draw rolls 10 and 20 as shown in FIG. 9, in which position they will operate at higher surface speeds than that of the maximum draw-surface 26 on the multiply terraced roll 20 so that the fiber 5 experiences one additional stage of draw after leaving the terraced draw rolls. The cylindrical draw rolls may be constructed with or without internal heating means.

The important advantage of the tandem arrangement of terraced and cylindrical draw rolls is that it permits flexible and minute adjustments of the overall draw-ratio to values of the draw-ratio other than those that are built into the multiply terraced draw rolls. For example, if the minimum and maximum diameter of the microterraces on the incremental draw rolls are three inches and six inches respectively, that is, in a ratio of 1:2, draw ratios that are fractionally or integrally higher are obtained by setting the surface speed of the tandem cylindrical draw-rolls, which follow the incremental draw, to run at that multiple of the maximum microterrace surface-speed that will give the desired overall draw-ratio. For example, when a draw ratio of 2.46 is required, the cylindrical, tandem, following draw-roll surface operates at a speed 1.23 times the last microterrace 52 surface speed. As another example, when an overall draw ratio of 5.23 is required, the tandem cylindrical draw-roll surface speed is set at 5.23/2 or 2.615 times the maximum microterrace surface speed. Alternatively, the draw rolls preceding the microterraced rolls can be operated at a surface speed less than the speed of the surface of first contact 51 on the microterraced spindles, for example by a factor of 1.75, and the draw rolls following can operate at a surface speed that is greater than that of the last microterrace 52 by a factor of 1.494 so that the combined tandem draw ratio is 1.75 times 2.0 times 1.494 or 5.23. Changing the speed setting of the tandem cylindrical draw roll is an operation that is much simpler and more flexible than changing the cylindrical draw-roll 50 and particularly the microterraced draw roll 10 and 20 diameters.

Other very significant advantages of the tandem arrangement of microterraced draw-rolls, and cylindrical draw rolls are that they permit:

(1) reducing the axial length and weight of the microterraced draw rolls without reducing overall draw-ratios;

(2) operating at high draw-ratios on compact sets of rolls;

(3) operating a single set of tandem rolls over a very wide range of processing conditions, which is an important advantage to the machine owner; and (4) making small adjustments in draw ratio in order to compensate for polymer viscosity, denier, and other property variations in the fiber supplied, or to permit adjustment of properties such as break elongation of the final finished fiber.

Tandem drawing is particularly suitable for use when the fiber forming and drawing operations are combined into one continuous operation. In such combined application, the microterraced spindles receive the freshly extruded fiber and accelerate and draw it gradually and without excessive or damaging force. The fiber 5 leaving the muliply terraced draw rolls is partially oriented and sufficiently strengthened so that it can then be completely drawn at high speed into the final draw-ratio by the tandemly located cylindrical draw-rolls 50.

Figure 11:
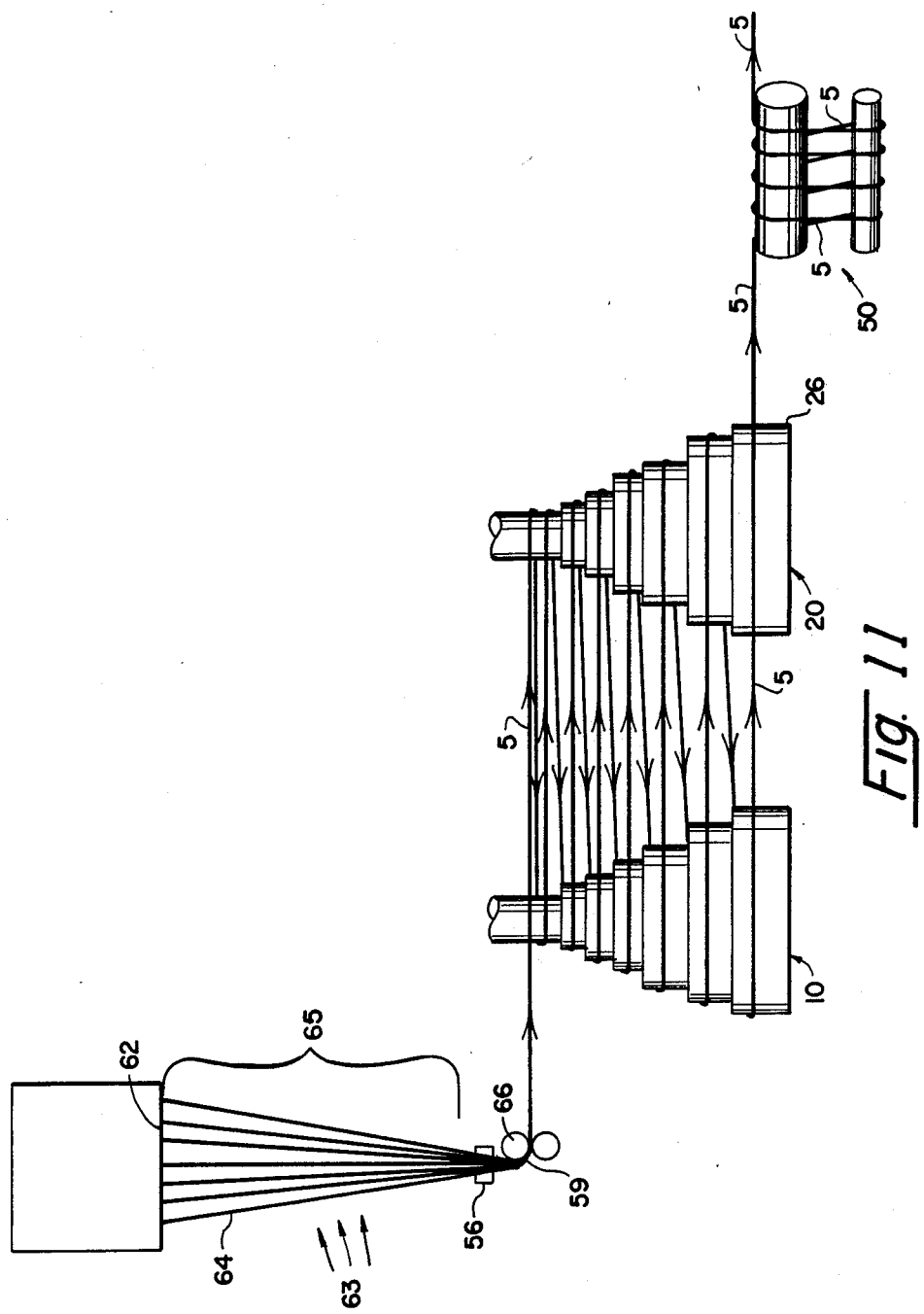
FIG. 11 shows high speed spinning and incremental drawing on microterraced spindles in tandem with cylindrical draw rolls.

U.S. Pat. No. 3,978,192 teaches that incremental drawing can operate at "a speed at which the fibers are melt spun or extruded, thus making an intermediate storage of the fibers unnecessary". Unexpected productivity and further quality gains are realized when a melt spun fiber spinning operation is coupled directly to a tandem incremental draw operation in accord with certain operating principles described hereafter. Improved birefringence uniformity, cross-sectional uniformity, and physical properties are produced when operating according to these principles. The coupled process is shown in FIG. 11 and consists of multiple microterraced incremental draw rolls 10 and 20 followed in tandem by a set or sets of cylindrical draw rolls 50.

In the preferred method of operation, the individual filaments are extruded through a spin pack 62 and are cooled or quenched by cold air 63. The individual filaments are gathered into one or more fiber threadlines on leaving the outlet 56 of the fiber quenching zone step. They are preferably uniformly quenched, and they have minimum orientation and birefringence. To achieve quenching and birefringence uniformity and low orientation it is required that a melt spun filament 64 be subjected to only a minimum amount of extension and acceleration in passing from the spinnerette 62 to the first solid surface 66 that it contacts after quenching, and that quenching air flows uniformly around each filament with minimum turbulence. The precise amount of extension or acceleration imposed on a melt spun fiber will depend on spinnerette hole diameter (not shown) and final denier, as well as on the viscosity and chemical composition of the polymer. The general processing principle that is to be followed is that there should be minimum extension in the spinning column followed by maximum extension in the draw-zone. This means that extension, and acceleration of the unsolidified, freshly formed fiber 64 be as low as possible in the quench zone 65 and just sufficient to develop the smallest fiber tension that will maintain a stable fiber stream from the face of the spinnerette to the point of finish application. It requires that the fiber velocity at the quench zone outlet 56 should be close to the velocity of free fall of the fiber. Generally, this will be from one to twenty times the free fall velocity but preferably from one to five times the free fall velocity when extrusion occurs in the downward direction. The preferred velocity increase between the polymer flow velocity in the spinnerette orifice and the fiber velocity at the exit of the quenching zone 56 is between five and fifteen times for fibers having a final drawn weight of five to thirty denier (grams per 9000 meters) per filament. For fine fibers of one to three denier per filament a higher acceleration may be used. A higher acceleration may also be used when extrusion occurs in the upward direction.

The tandem incremental drawing roll assembly comprised of microterraced spindles 10 and 20 and cylindrical rolls 50 gently accelerates and draws the freshly quenched fibers 59 to a final speed, and to an extent, that can be higher than that which is generally possible by conventional drawing or high speed spinning processes. On leaving the quenching zone, the low orientation spun fibers can be accelerated and elongated more than fibers spun at higher speed so that overall productivity is increased. Low acceleration of filaments 64 through the quench zone 65 extends the time for quenching and improves the uniformity of birefringence among the fibers particularly when many fibers issue from the same spinnerette.

The acceleration and elongation of freshly spun fibers by incremental drawing on microterraced, cylindrical and tandem draw roll assemblies 50 operating in series with a spinning or extruding machine is smoother and greater than that which can be accomplished by conventional draw rolls. Adjustment of the draw ratio by fractional or by large amounts to compensate for polymer property changes or product specification changes is readily accomplished by changing the draw-ratio in the final tandem draw-stage. For melt spun fibers the acceleration and elongation of the fiber in the draw zone that is tandem to the incremental draw zone is generally more than about 1.5 times.

Figure 12:
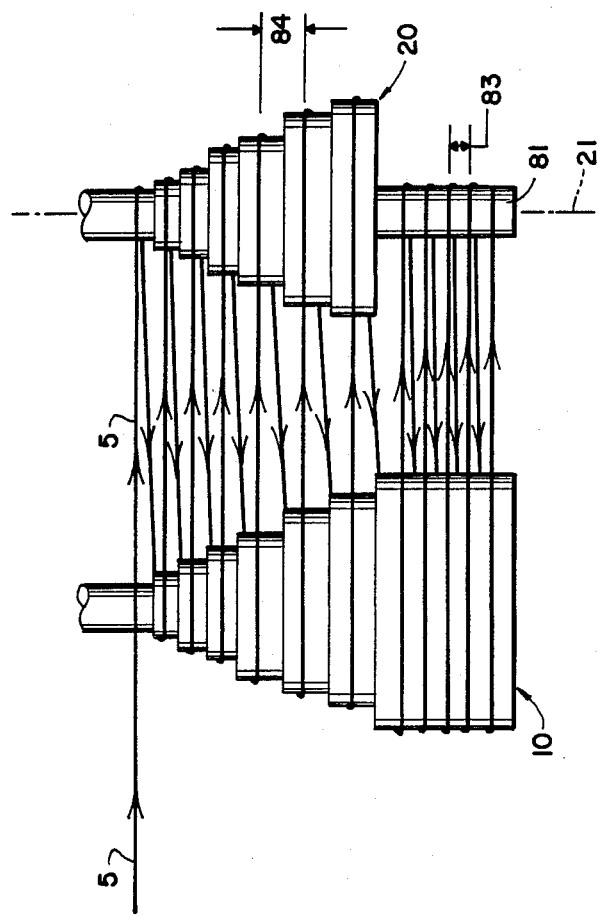
FIG. 12 shows microterraced spindles with a coaxial idler.

FIG. 12 illustrates a set of non-identical spindles for incrementally drawing fibers 5, the second spindle 20 having a coaxially mounted small diameter cylindrical shaft extension 81 mounted so that it can rotate independently and freely on the main spindle axis 21. This allows the fiber helix to take on a pitch 83 that is smaller than that on the preceding microterraces 84 so that the residence time on this terrace can be increased substantially. The arrangement is useful for quenching and heat setting fiber after drawing and is similar in application to the assembly shown in FIG. 6, but is more compact and easier to string-up with fiber.

Figure 13:
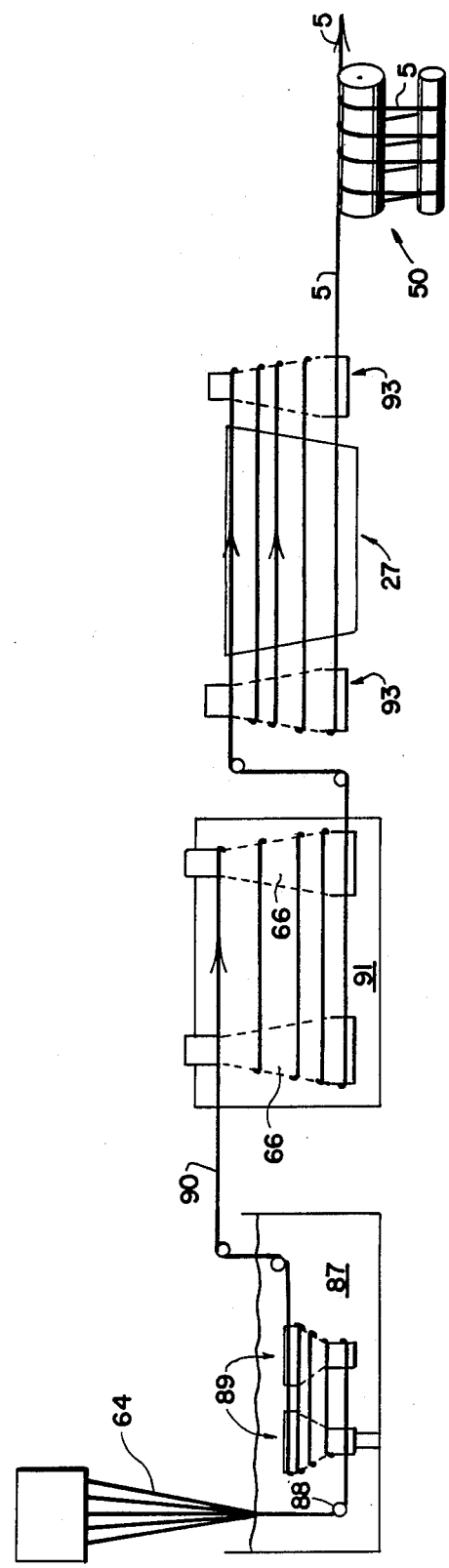
FIG. 13 shows microterraced spindles being used to incrementally draw gel-spun fibers during extraction, drying and final drawing.

FIG. 13 illustrates a process for incremental extension of a gel-spun fiber such as high molecular weight polyethylene. Gel spun fibers are formed from relatively dilute solutions of polymers that have very high molecular weight. A representative example of such polymers is linear polyethylene having a molecular weight of about 1.9 million daltons. Fibers are produced by extruding a relatively dilute (about 5%) solution of the high molecular weight polyethylene dissolved in a solvent such as decalin or paraffin oil. The method of spinning and drawing these fibers is described in U.S. Pat. Nos. 4,422,993, Dec. 27, 1983 to Smith et al, and 4,413,110, Nov. 1, 1983 to Kavesh and Prevorsek, as well as in other publications.

A characteristic of gel spun fibers is their extreme drawability which gives them very high molecular orientation and very high strength. To realize its full drawability, the fibers must be drawn at low draw rates, which necessarily lowers the speeds at which they are now produced.

Gel spun fibers of polymers such as polyacetal, polyvinyl alcohol, polyvinyl chloride, and acrylonitrile, nylon-6, and most particularly fibers made from high molecular weight linear polyethylene can be drawn to the limits of their drawability and achieve very high orientation and tensile strength when processed by incremental extension and drawing on microterraced rolls. In addition, the productivity of the process machinery is substantially increased because the forwarding speed of the fiber is high while the rate of drawing is kept very low by incremental drawing, which inherently has the effect of uncoupling the rate of draw from the forwarding speed of the fiber.

As shown in FIG. 13, freshly extruded polymer gel filaments 64 enter a liquid bath 87 that quenches and hardens the polymer gel and/or extracts the solvent from the fibers. The bundle of filaments is conducted by suitable guides and rollers 88 to a set of microterraced incremental draw rolls 89 that are submerged in the quenching or extraction bath, and that incrementally extend the fiber as it is being extracted. The incremental draw rolls 89 increase the completeness and speed of the extraction, and simultaneously draw the fiber at a rate that can be adjusted to the extent of quenching or extraction.

If, as is done currently, the freshly extruded gel fiber is simply pulled through the quenching or extraction bath, then all the drawing or deformation of the fiber occurs at an uncontrolled rapid rate in the molten, unextracted and softest portions of the gelled filament without effectively increasing orientation of the polymer molecules. Consequently, it has been reported by A. J. Pennings "Ultra-High Strength Polyethylene Fibers", Proceedings of International Symposium on Fiber Science and Technology, FIG. 4, p. 20-23, ISF-85, Hakone, Japan, August, 1985, that the tensile strength of gel-spun fiber decreases as the extension of the wet fiber increases. The submerged incremental draw-rolls, by contrast, cause the extension of the gel fiber to occur at a low and controlled rate after solidification and extraction have begun and as the cooling and extraction continues. Because the rate of elongation is determined by the number of draw increments and the size of each draw increment, more effective alignment of the polymer molecules with the fiber axis is produced and the decrease in tensile strength with wet fiber extension reported by Pennings is not manifested.

The quenched or extracted fiber 90 is forwarded to a vented drying chamber 91 where residual solvents are removed while the fiber is further drawn on a second set of microterraced incremental draw rolls 66. From the drying chamber 91 the dry fiber passes to a final set of incremental draw rolls 93 fitted with interspindle heaters 27 and tandem draw rolls 50 where the fiber 5 achieves its final extent of draw and is also subjected to heat treatment, defect repair, annealing, and quenching. Typical draw-ratios accomplished in the quenching and extraction bath, drying chamber and final draw rolls, respectively, are 7X, 2.1X and 5.0X for a net extension of 73.5 fold.

Figure 14:
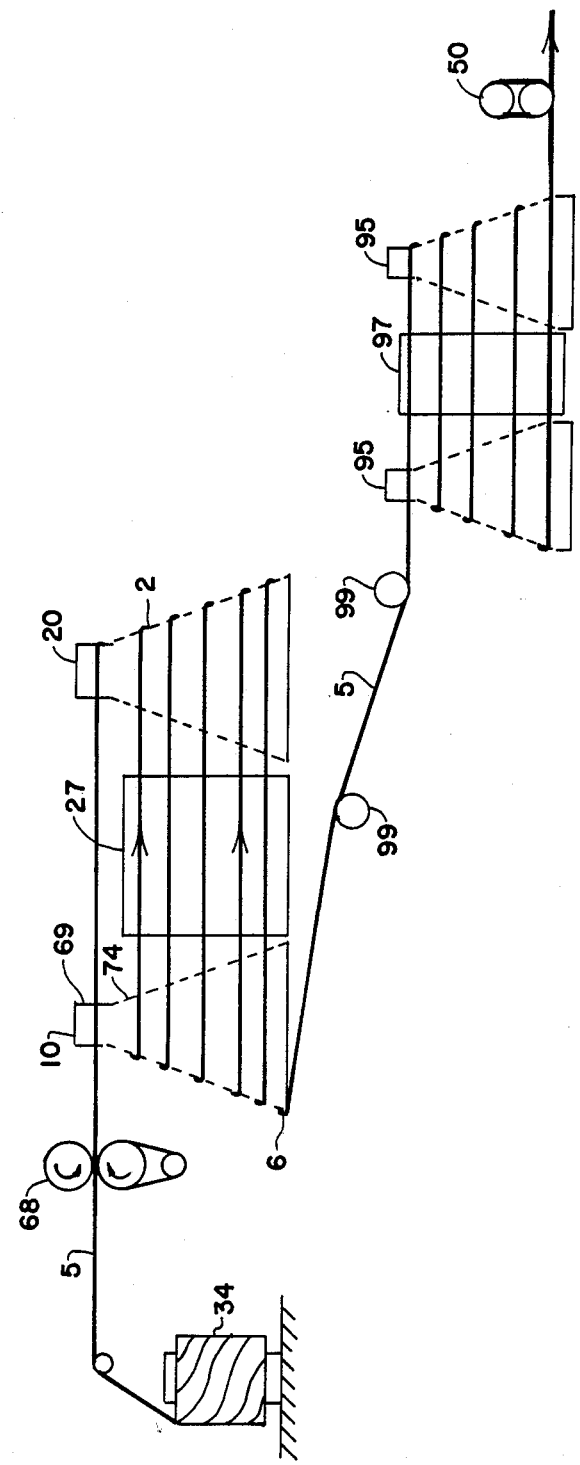
FIG. 14 shows an IDP arrangement using two sets of microterraced draw rolls in cascade array with interspindle heaters and with means for controlling the points of fiber transfer from the first to the second set.

It is possible to make many alternative arrangements of the sets of incremental draw rolls and draw ratios in the gel spinning operation. A particularly effective arrangement employs a two set cascade of incremental tandem draw rolls that operate only on the dry gel spun fiber. An example of such operation is illustrated in FIG. 14 and operates as described below.

Dried partially oriented gel spun ultra-high molecular weight polyethylene fiber 5 comprised of twenty filaments having a total denier of 350, is fed from supply bobbins 34 or directly from a predrawing stage or drying chamber to metering rolls 68 and then to the first pair of multiply microterraced incremental draw spindles 10 and 20 having a minimum terrace diameter of 3 inches and a maximum terrace diameter of 12.15 inches. Spindle 10 which is first contacted by fiber 5 has a total of ten microterraces whereas the second spindle 20 has one fewer microterrace or nine microterraces arranged so that the fiber helix on completing ten wraps about the pair of spindles, contacts each microterrace on each spindle just one time, with the fiber making its final contact on the spindle of the first contact 10. In passage through the first pair of incremental draw spindles 10 and 20 the fiber 5 is drawn 4.05 times in 20 draw increments each of which, on average, imposes a draw of 1.072X on the fiber, because each successive microterrace contacted by the fiber is on average 7.2% larger in diameter than the preceding microterrace. The actual draw increments start at 9% and end at 5%. The fiber may be heated during each interspindle passage by interspindle heaters 27 which maintain a temperature gradient that in this instance starts at about 130 degrees C. for the first interspindle passage of the fiber and rises gradually to about 140 degrees C. at the last interspindle passage of the fiber between spindles 20 and 10.

Metering rolls 68 control the flow of fiber 5 to the incremental draw rolls 10, 12, and generally operate at a surface speed that is 1% to 5% lower than that of the first surface of fiber contact on spindle 10. Rolls 68 may also serve as tandem draw rolls particularly if they are internally heated.

The fiber leaves the first set of microterraced spindles at point 6 and enters on the second set of spindles 95, 96. A set of adjustable guides 99 may be used to act as means for directing fiber exiting from any microterrace on spindle 10 to enter on any microterrace on the second pair of spindles 95, 96. For operation at maximum draw ratios, the guides are adjusted to direct the fiber leaving the largest microterrace on spindle 10 to enter on the smallest diameter surface on spindle 95. The surface of fiber entry on spindle 95 will generally move at a speed that is adjustably higher or slightly lower than the speed of the fiber discharging surface on the first set of microterraced spindles, in order to allow the tension and the extent of draw of the fiber 5 cascading from the first to the second spindle set to be precisely controlled.

The second set of microterraced draw rolls 95, 96, in this example, operates differently than the first set of microterraced rolls. These rolls typically accommodate 10 wraps of the fiber helix, each wrap contacting one contiguous microterrace on each spindle one time. There are 10 microterraces on the first spindle 95 and 9 microterraces on the second spindle 96. Each successive microterrace on each one of these spindles is on average nominally 4% larger in diameter than the preceding microterrace on that same spindle so that the overall draw ratio accomplished by the second set of draw spindles is 1.480X, or 1.04 raised to the tenth power. The actual draw increments start at 5% and end at 3%. In addition, the spindle of first contact 95 differs from the spindle of second contact 96 in that each microterrace on this second spindle 96 that receives fiber has substantially the same diameter as the microterrace on the first spindle 95 from which that portion of fiber has just departed, so that the fiber tends to be drawn once rather than twice in each complete wrap about this spindle pair. This arrangement of microterrace diameter increments provides more time between increments of drawing for heating, stress relaxation. and molecular defect removal to occur in the processing fiber. Such a time increase is particularly important at the upper limits of fiber draw ratio, as is the smaller magnitude of the draw increments on the second set of microterraced rolls. A second set of interspindle heaters 97 may be used with the second set of incremental draw rolls. Preferably these should operate with a temperature gradient that starts at about 140 degrees C. at the first wrap and reaches a temperature of about 146 degrees C. at the last fiber wrap.

The overall draw accomplished on the two sets of microterraced spindles is the product of the draws on the first and second sets, or 4.05 times 1.48 which is nominally 6X. On leaving the second set of microterraced rolls the fiber may be further extended through tandem cylindrical rollers 50, and subjected to heat setting, quenching and further processing or packaging. The finished fiber has a tenacity of about 34 grams per denier or above and a modulus of about 1200 grams per denier. Its elongation at break is 4%.

Figure 15:
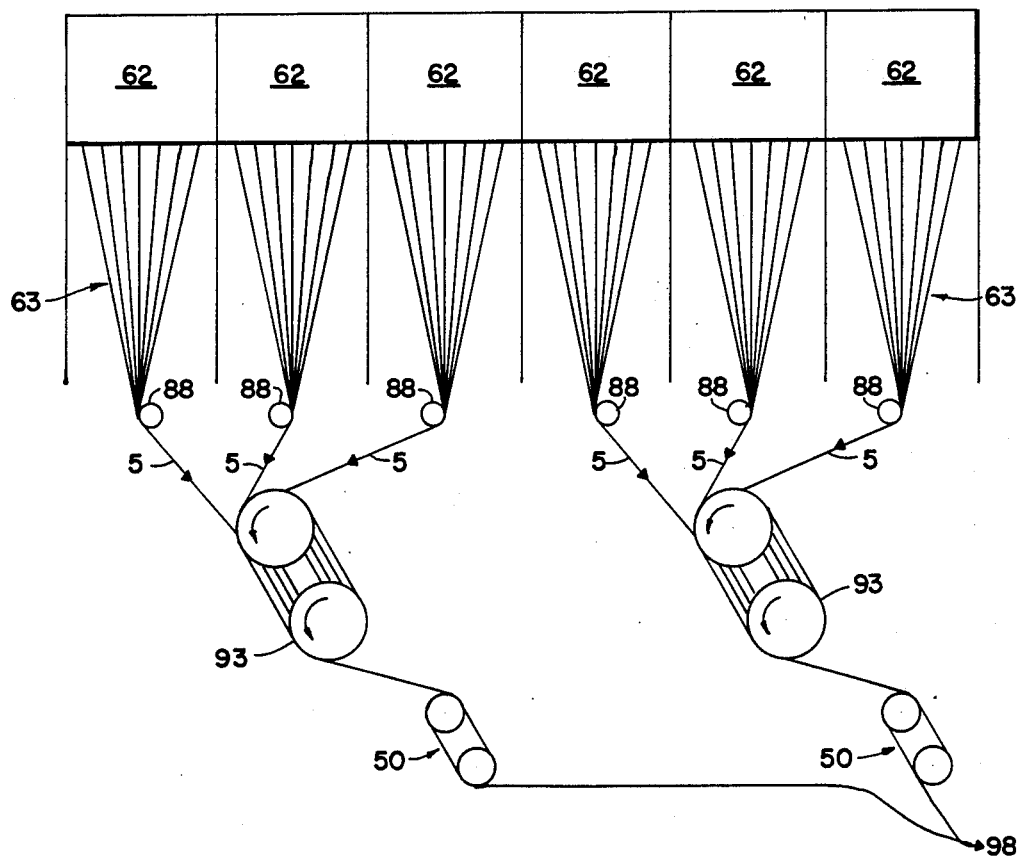
FIG. 15 shows simultaneous incremental drawing of multiple spun threadlines that are combined to produce a single heavy staple tow.

FIG. 15 illustrates the use of incremental draw spindles in a novel staple fiber tow production process. Sets of microterraced draw spindles 93 designed for multiple threadline operation are mounted on the face of the machine so as to receive and draw the fiber 5 extruded through spinning packs 62 and air quenched in adjacent quenching columns 63. Guide means 88 lead the fiber 5 formed from one to about three spin packs 62 to the spindles 93 where it is incrementally drawn before entering the tow. Spindles 93 may be followed by a set of tandem draw rolls 50 to permit adjustments in draw ratio. The fibers from each set of incremental draw rolls are combined after they have been drawn to form a heavy tow 98 that is then taken to crimping, heat setting, and further processing at high speed and with minimal handling. This process differs from existing staple tow producing processes in that fiber threadlines are drawn before they are gathered into a tow. In existing staple fiber processes, undrawn threadlines are gathered into a massive tow. The undrawn tow is then sent to a massive tow-drawing machine.

The advantages of producing staple fiber tow in this fashion are that low-speed, massive tow-drawing machines are eliminated, as are the piddling, storing, handling, and transport of undrawn as-spun fiber tows. These advantages are possible only because fiber can be drawn at speeds comparable to the spinning speeds when the drawing is done on microterraced spaced apart spindles.

Even though the advantages and characteristics of the invention have been set forth in the foregoing description, together with the details of the structure and function of the invention, it is understood that the disclosure is illustrative only. The present invention is indicated by the broad general meaning of the terms in which the appended claims are expressed.

What is claimed is:

1. In apparatus for drawing fibers in small increments by passing said fiber with plural helical turns between a plurality of spaced-apart spindles, each of said spindles being elongated about an axis that extends transversely to the helical turns of said fiber thereon and is canted relative to said axis of the other spindle, and each of said spindles having a rotating fiber-bearing outer surface the radius of which changes along said axis thereof, said fiber-bearing surface being formed of a plurality of discrete circumferential microterraces of different radii which are substantially parallel to said axis of rotation of the corresponding one of said spindles, said fiber-bearing surface being designed and disposed for engaging each helical turn of said fiber frictionally and for supporting each said turn without imposing any substantial axially-directed restraint on said fiber, the improvement wherein:

each said microterrace on at least a first of said spindles has an axial length dimension dependent on the draw increment imposed on the portion of said fiber contacting said microterrace and dependent upon the pitch ($p_i$) of said helical turn of said fiber helix defined by a first equation:

$$p_i = [(DI_i + \cos \phi) r_i - a_i \sin \phi] \sin \phi$$

where:

$\phi$ is the angle of cant of said axes as measured in the projection along the perpendicular common to said spindles;

$a_1$ is the axial distance between the point of intersection of said spindle axes in said projection and the first intersection of said fiber with said axis of said first spindle;

$a_i$ is the axial distance between the point of intersection of said spindle axes and the "i"th intersection of said wrap of said fiber with said first spindle axis in said projection; and $a_i$ is other than $a_1$ and is substantially related to $a_1$ by a second equation:

$$a_i = a_1 + \sum_{x=1}^{i-1} p_x$$

$p_i$ is said pitch, or distance as measured on said spindle axis between consecutive intersections of said wrap of said fiber with said first spindle axis;

$r_1$ is the radius of said surface of first contact on said first spindle;

$DI_i$ is the draw ratio increment imposed on said fiber as it moves from said first spindle to said other spindle, at position $a_i$, and is equal to the ratio of the radius $r'_i$ to $r_i$, which is the ratio of the other spindle fiber receiving radius to the first spindle fiber sending radius; and $r_i$ is the radius of said first microterraced spindle at axial distance $a_i$, $r_i$ being substantially equal to $r_1$ times the product of all draw increments preceding microterrace $r_i$.

2. Apparatus as defined in claim 1 further comprising: heating means for heating at least one of said microterraces.

3. Apparatus as defined in claim 2 further comprising: insulating means for insulating each of said microterraces that have been heated by said heating means.

4. Apparatus as defined in claim 2 wherein said heating means is designed and disposed for producing a temperature difference between one or more of said microterraces on at least one of said spindles.

5. Apparatus as defined in claim 1 further comprising: unterraced cylindrical spindle extension means coaxially attached to the larger diameter end of at least one of said spaced-apart spindles.

6. Apparatus as defined in claim 5 wherein said axial extension has a width dimension at least twice the width of the first said microterrace contacted by said fiber.

7. Apparatus as defined in claim 5 further comprising: an independently mounted idler separator roll for annealing said fiber, said idler roll being disposed adjacent said extension means so as to permit said fiber to be wrapped helically around both said idler roll and said extension means with a helix pitch smaller than the helix pitch of said fiber on said microterraced portion of said spindle bearing said extension means.

8. Apparatus as defined in claim 1 further comprising: interspindle heating means for heating said fiber to a different temperature at each passage of said fiber between said spindles.

9. Apparatus as defined in claim 8 wherein said interspindle heating means has a microterraced, stationary surface.

10. Apparatus as defined in claim 9 wherein said terraced surface of said interspindle heating means is in the form of a slightly twisted ribbon.

11. Apparatus as defined in claim 1 in which each said spindle has a different number of said microterraces.

12. Apparatus as defined in claim 11 in which the difference in said number of microterraces of each said spindle is one.

13. Apparatus as defined in claim 1 wherein the diameter of each of said microterrace is different from the diameter of all other said microterraces.

14. Apparatus as defined in claim 1 wherein each said microterrace is separated from adjacent microterraces by s-shaped risers.

15. Apparatus as defined in claim 14 wherein said risers are inclined toward the exit end of said spaced-apart spindles at an angle between 0 and 15 degrees from the plane perpendicular to the spindle axis.

16. Apparatus as defined in claim 1 wherein each said microterrace on a second of said spindles has an axial length dimension dependent on the draw increment imposed on the portion of said fiber contacting said microterrace and dependent upon the pitch ($p_i'$) of said helical turn of said fiber helix defined by a third equation:

$$p_i' = [(DI_i' + \cos \phi)r_i' - a_i' \sin \phi] \sin \phi$$

where:

$\phi$ is the angle of cant of said axes as measured in the projection along the perpendicular common to said spindles;

$a_1'$ is the axial distance between the point of intersection of said spindle axis in said projection and the first intersection of said fiber with said axis of said second spindle;

$a_i'$ is the axial distance between the point of intersection of said spindle axes and the "i"th intersection of said wrap of said fiber with said second spindle axis in said projection; and $a_i'$ is other than $a_1'$ and is substantially related to $a_1'$ by a fourth equation:

$$a_i' = a_i' + \sum_{x=1}^{i-1} p_x'$$

$a_1'$ being related to $a_1$ by a fifth equation:

$$a_1' = a_1 \cos \phi + r_1 \sin \phi;$$

$p_i'$ is said pitch, or distance as measured on said spindle axis between consecutive intersections of said wrap of said fiber with said second spindle axis;

$r_1'$ is the radius of said surface of first contact on said second spindle;

$DI_i'$ is the draw ratio increment imposed on said fiber as it moves from said second spindle to said first spindle, at position $a_i'$; and is equal to the ratio of the radius $r_i$ to $r_i'$, which is the ratio of the first spindle fiber receiving radius to the second spindle fiber sending radius; and $r_i'$ is the radius of said second microterraced spindle at axial distance $a_i'$, $r_i'$ being substantially equal to $r_1$ times the product of all draw increments preceding microterrace $r_i'$.

* * * * *

UNITED STATES PATENT AND TRADEMARK OFFICE
CERTIFICATE OF CORRECTION

PATENT NO. : 4,891,872   Page 1 of 2

DATED : January 9, 1990

INVENTOR(S) : Martin V. Sussman

It is certified that error appears in the above-identified patent and that said Letters Patent is hereby corrected as shown below:

Column 4, lines 52 through 54 inclusive, delete "$\sum_{x=1}^{i-1} p_x;$" and substitute therefor -- $a_i = a_1 + \sum_{x=1}^{i-1} p_x;$ --;

Column 4, lines 63 through 65 inclusive, delete "$r_1 \prod_{x=1}^{i-1} (DI_x);$" and substitute therefor -- $r_i = r_1 \prod_{x=1}^{i-1} (DI_x)$ --; and Column 5, lines 25 through 27 inclusive, delete "$\sum_{x=1}^{i-1} p'_x$" and substitute therefor -- $a'_i = a'_1 + \sum_{x=1}^{i-1} p'_x$ --.

UNITED STATES PATENT AND TRADEMARK OFFICE
CERTIFICATE OF CORRECTION

PATENT NO. : 4,891,872
DATED : January 9, 1990
INVENTOR(S) : Martin V. Sussman

It is certified that error appears in the above-identified patent and that said Letters Patent is hereby corrected as shown below:

Claim 13, column 19, line 7, delete "microterrace" and substitute therefor -- microterraces --;

Claim 16, column 19, line 31, delete "axis" and substitute therefor -- axes --; and Claim 16, column 20, line 10, delete "$a'_i$" (second occurrence) and substitute therefor -- $a'_1$ --.

Signed and Sealed this

Thirty-first Day of December, 1991

Attest:

HARRY F. MANBECK, JR.

*Attesting Officer*  *Commissioner of Patents and Trademarks*